(12) United States Patent
Chen et al.

(10) Patent No.: US 12,645,507 B2
(45) Date of Patent: Jun. 2, 2026

(54) POWER MANAGEMENT FOR VIRTUAL NETWORK FUNCTIONS OR CONTAINERIZED NETWORK FUNCTIONS

(71) Applicant: Red Hat, Inc., Raleigh, NC (US)

(72) Inventors: Huamin Chen, Westford, MA (US); Yuval Lifshitz, Kfar HaOranim (IL); Douglas Smithy, Bolton, MA (US)

(73) Assignee: Red Hat, LLC, Raleigh, NC (US)

( * ) Notice: Subject to any disclaimer, the term of this patent is extended or adjusted under 35 U.S.C. 154(b) by 511 days.

(21) Appl. No.: 18/309,009

(22) Filed: Apr. 28, 2023

(65) Prior Publication Data

US 2024/0362080 A1     Oct. 31, 2024

(51) Int. Cl.
| | |
|---|---|
| *G06F 9/50* | (2006.01) |
| *G06F 1/32* | (2019.01) |
| *G06F 1/3203* | (2019.01) |
| *H04L 41/0895* | (2022.01) |
| *H04L 41/122* | (2022.01) |
| *H04L 41/40* | (2022.01) |

(52) U.S. Cl.
CPC .............. *G06F 9/5094* (2013.01); *G06F 1/32* (2013.01); *G06F 1/3203* (2013.01); *G06F 9/5027* (2013.01); *G06F 9/5072* (2013.01);
*G06F 9/5077* (2013.01); *H04L 41/0895* (2022.05); *H04L 41/122* (2022.05); *H04L 41/40* (2022.05)

(58) Field of Classification Search
None
See application file for complete search history.

(56) References Cited

U.S. PATENT DOCUMENTS

| | | | |
|---|---|---|---|
| 2018/0173547 A1 | 6/2018 | Stokes et al. | |
| 2022/0113790 A1 | 4/2022 | Doshi et al. | |

FOREIGN PATENT DOCUMENTS

| | | | | | |
|---|---|---|---|---|---|
| EP | 4325794 B1 | * | 9/2025 | .......... | G06F 1/3275 |
| WO | 2022065900 A1 | | 3/2022 | | |
| WO | WO-2024037863 A1 | * | 2/2024 | ......... | H04L 41/0833 |
| WO | WO-2024179716 A1 | * | 9/2024 | ......... | H04L 43/0876 |

* cited by examiner

*Primary Examiner* — Qing Yuan Wu
(74) *Attorney, Agent, or Firm* — Dority & Manning, P.A.

(57) ABSTRACT

A method includes determining, by a processing device, an intended level of power consumption associated with a network function; allocating, in view of the intended level of power consumption, a network device to the network function; allocating, in view of the intended level of power consumption, a processor to the network function; and designating the processor to handle interrupts from the network function via the network device.

14 Claims, 7 Drawing Sheets

500

Determine an intended level of power consumption associated with a network function, the network function implemented in a virtualized computing environment in a containerized computing cluster, where the containerized computing cluster comprises a plurality of virtualized computing environments running on one or more host computer systems, where the network function comprises at least one of a virtualized network function or a containerized network function, where the intended amount of energy consumption is within one of at least two ranges, each range representing a respective power level
510

Allocate, in view of the intended amount of power consumption, a network device to the network function
520

Allocate, in view of the intended amount of power consumption, a processor to the network function
530

Designate the processor to handle an interrupt from the network function via the network device
540

```
apiVersion: v1
kind: Pod
metadata:
  name: example-high-power-pod
  annotations:
    kubernetes.io/power-consumption-intent: high
```

FIG. 4A

```
apiVersion: v1
kind: Pod
metadata:
  name: example-low-power-pod
  annotations:
    kubernetes.io/power-consumption-intent: low
```

FIG. 4B

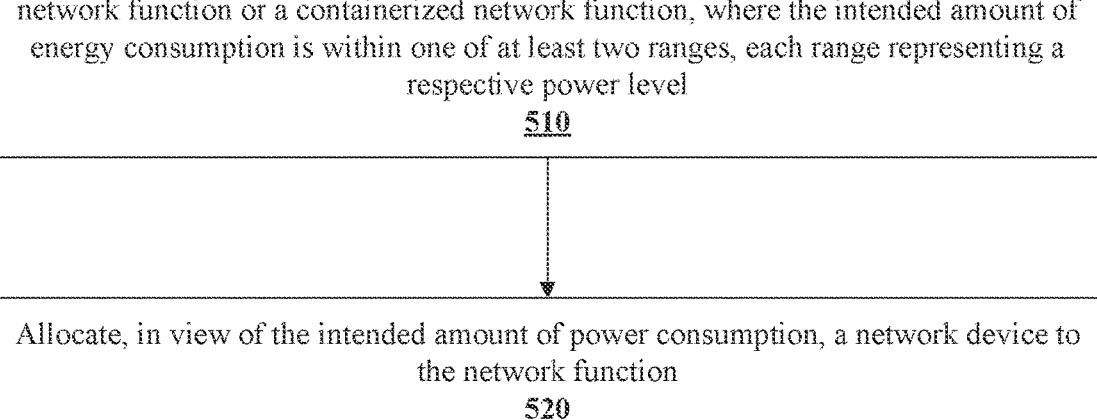

Determine an intended level of power consumption associated with a network function, the network function implemented in a virtualized computing environment in a containerized computing cluster, where the containerized computing cluster comprises a plurality of virtualized computing environments running on one or more host computer systems, where the network function comprises at least one of a virtualized network function or a containerized network function, where the intended amount of energy consumption is within one of at least two ranges, each range representing a respective power level
510

Allocate, in view of the intended amount of power consumption, a network device to the network function
520

Allocate, in view of the intended amount of power consumption, a processor to the network function
530

Designate the processor to handle an interrupt from the network function via the network device
540

FIG. 5

POWER MANAGEMENT FOR VIRTUAL NETWORK FUNCTIONS OR CONTAINERIZED NETWORK FUNCTIONS

TECHNICAL FIELD

The present disclosure is generally related to power management, and more particularly, to power management for virtual network functions (VNFs)/containerized network functions (CNFs).

BACKGROUND

Virtualization allows multiplexing of an underlying host machine between different virtual machines. The virtualization may be provided by a hypervisor (e.g., virtual machine monitor (VMM)) to enable the hypervisor to allocate a certain amount of a host system's computing resources to each of the virtual machines.

BRIEF DESCRIPTION OF THE DRAWINGS

The present disclosure is illustrated by way of example, and not by way of limitation, and can be more fully understood with reference to the following detailed description when considered in connection with the figures in which:

FIGS. 4A and 4B depict examples of providing power consumption intent, in accordance with one or more aspects of the present disclosure.

FIG. 5 depicts a flow diagram of an example method for implementing the power management for virtual network functions (VNFs)/containerized network functions (CNFs), in accordance with one or more aspects of the present disclosure.

DETAILED DESCRIPTION

Figure 1:
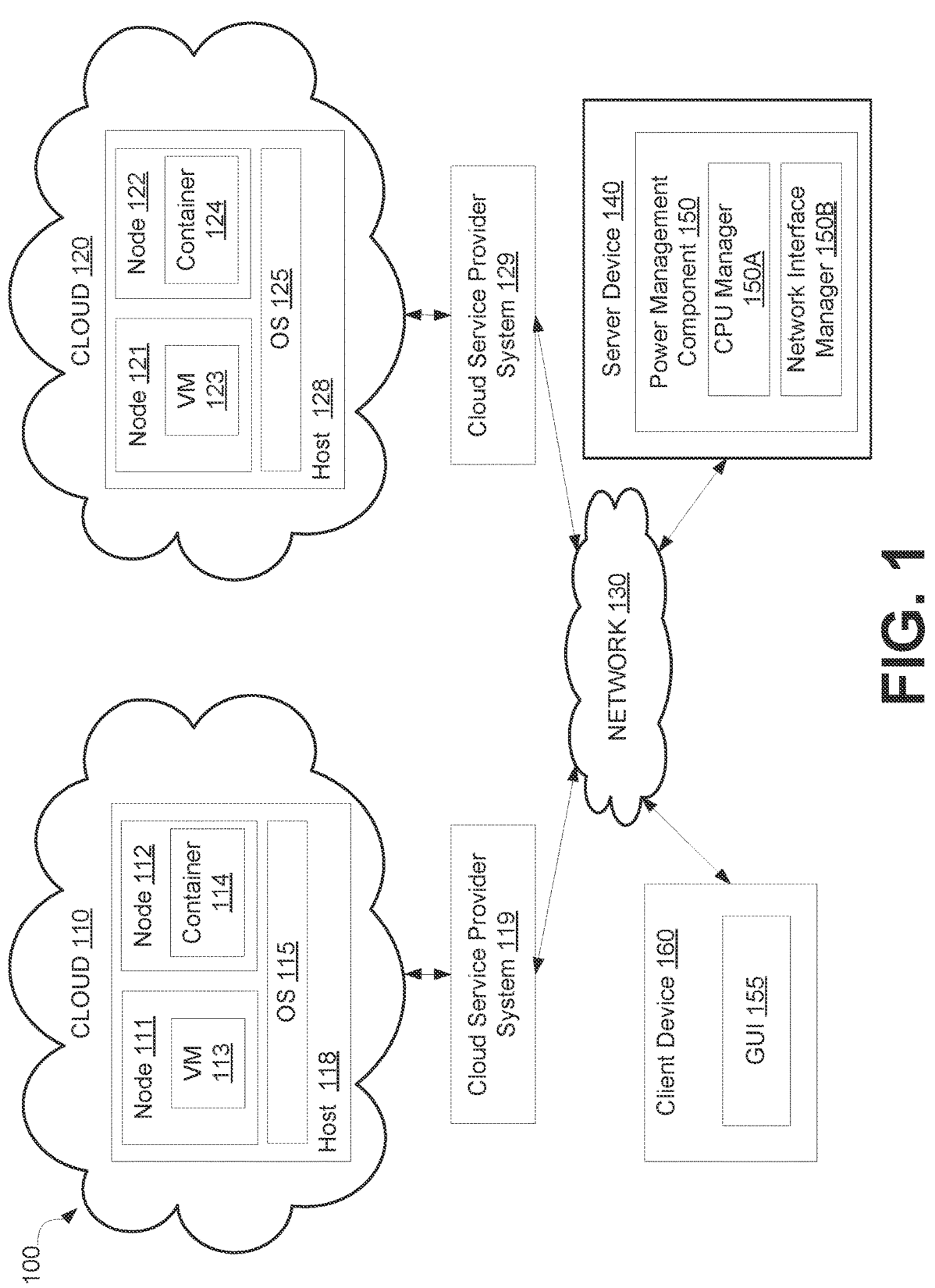
FIG. 1 depicts a high-level component diagram of an example of a computer system architecture, in accordance with one or more aspects of the present disclosure.

Described herein are methods and systems for implementing power management for virtual network functions (VNFs)/containerized network functions (CNFs). In virtualization, each virtual machine is then able to configure and use virtualized computing resources (e.g., virtual processors) to execute executable code of a guest operating systems. A host machine can accommodate more virtual machines than the size of its physical memory allows, and give each virtual machine the impression that it has a contiguous address space, while in fact the memory used by the virtual machine may be physically fragmented and even overflow to disk storage. Containerization is an operating-system-level virtualization environment for running multiple isolated system containers on a single host machine. It is an alternative to full machine virtualization that involves encapsulating a process into a container with its own operating environment. Each virtual container may share the kernel of the underlying operating system without requiring its own kernel. Avoiding separate kernels for each container may reduce computational overhead.

Virtualization and containerization are often used with the network infrastructure (e.g., in cloud computing platforms) for efficiently managing resources. A network infrastructure can include various components, such as routers, firewalls, flow monitoring, packet inspection, intrusion detection, address translation component, etc., and each component can be referred to as a network function (NF). In legacy networks, network service providers deploy these NFs as physical network appliance per each function with tightly coupled, dedicated and proprietary hardware-software. The virtualization/containerization decouples NFs from their dedicated hardware into virtual network functions (VNFs)/containerized network functions (CNFs).

In virtualized/containerized systems, processors may be assigned to handle network interrupts from network devices (e.g., network interface controllers (NICs)) and are the major source of power consumption. The network device refers to a device that provides access to a network. However, some systems using VNFs/CNFs do not consider the power consumption of processors.

Aspects of the present disclosure address the above and other deficiencies by implementing power management for VNFs/CNFs by assigning computing resources based on an intended level of power consumption of a VNF/CNF. Specifically, a power management controller may designate at least two ranges for a level of power consumption, where each range represents a respective power level (i.e., the values within a range can represent a same power level), for use in a virtualized computing environment in a containerized computing cluster. The containerized computing cluster can include a plurality of virtualized computing environments running on one or more host computer systems. The system controller can define an intended level of power consumption associated with a VNF/CNF in the virtualized computing environment, for example, by analyzing an annotation associated with the virtualized computing environment. The annotation can be used to declare intended level of power consumption and attached as metadata to VNF/CNF.

The system controller can identify a network device running at a power level corresponding to the intended level of power consumption and allocate the network device to the VNF/CNF. In some implementations, the system controller can allocate the network device through a virtual function. The virtual function in a virtual environment can be treated as a separate network interface, and can be assigned to a container or virtual machine, while multiple containers or virtual machines share a single physical network interface controller (e.g., a PCIe-based NIC). As such, the system controller can allocate the network resource represented by the virtual function to the VNF/CNF.

The system controller can identify a processor running at a specified frequency (e.g., below or above a threshold value) or with a core type (e.g., select, among several cores of a given instruction set architecture (ISA), a core running at the requisite power level) corresponding to the intended level of power consumption and allocate the processor to the VNF/CNF. Once the network device and the processor are allocated for the CNF/VNF, the system controller can designate the allocated processor to handle the interrupts generated by the CNF/VNF via the allocated network device to be align with CNF/VNF's intended level of power consumption.

Advantages of the present disclosure include improving the power efficiency of CNFs/VNFs within a cluster of computing resources. Also, by matching a power consumption intent of CNFs/VNFs with computing resources, the system provides a better accountability of power consumption and optimizes the power management of computing resources within the cluster. Further, by allowing the allocation of computing resources dynamically according to the power consumption intent, the system reduces a waste of resources and enhances the usage efficiency of resources.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environments 110, 120 (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 118, 128 implemented as part of the clouds 110, 120. For example, nodes 111 and 112 are hosted on physical machine of host 118 in cloud 110 provided by cloud provider 119. Similarly, nodes 121 and 122 are hosted on physical machine of host 128 in cloud 120 provided by cloud provider 129. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 118, 128. It should be noted, that while two cloud providers systems have been depicted in FIG. 1, in some implementations more or fewer cloud service provider systems (and corresponding clouds) may be present.

In some implementations, the host machines 118, 128 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 118, 128 without the use of VMs (e.g., a "bare metal" implementation), and in such an implementation, the hosts themselves are referred to as "nodes".

In various implementations, developers, owners, and/or system administrators of the applications may maintain applications executing in clouds 110, 120 by providing software development services, system administration services, or other related types of configuration services for associated nodes in clouds 110, 120. This can be accomplished by accessing clouds 110, 120 using an application programmer interface (API) within the applicable cloud service provider system 119, 129. In some implementations, a developer, owner, or system administrator may access the cloud service provider system 119, 129 from a client device (e.g., client device 160) that includes dedicated software to interact with various cloud components. Additionally, or alternatively, the cloud service provider system 119, 129 may be accessed using a web-based or cloud-based application that executes on a separate computing device (e.g., server device 140) that communicates with client device 160 via network 130.

Client device 160 is connected to host 118 in cloud 110 and host 128 in cloud 120 and the cloud service provider systems 119, 129 via a network 130, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 118, 128 may be a server computer system, a desktop computer, or any other computing device. The cloud service provider systems 119, 129 may include one or more machines such as server computers, desktop computers, etc. Similarly, server device 140 may include one or more machines such as server computers, desktop computers, etc.

In some implementations, the server device 140 may include a power management component 150, which can implement power management for VNFs/CNFs by matching computing resources with an intended level of power consumption associated with a VNF/CNF. The details regarding power management component 150 will be described with respect to FIGS. 2-6. Power management component 150 may be an application that executes on server device 140. In some implementations, power management component 150 can function as a web-based or cloud-based application that is accessible to the user via a web browser or thin-client user interface that executes on client device 160. While aspects of the present disclosure describe power management component 150 as implemented in a PaaS environment, it should be noted that in other implementations, power management component 150 can also be implemented in an Infrastructure-as-a-Service (IaaS) environment associated with a containerized computing services platform, such as Red Hat® OpenStack®. The functionality of power management component 150 will now be described in further detail below with respect to FIG. 2

Figure 2:
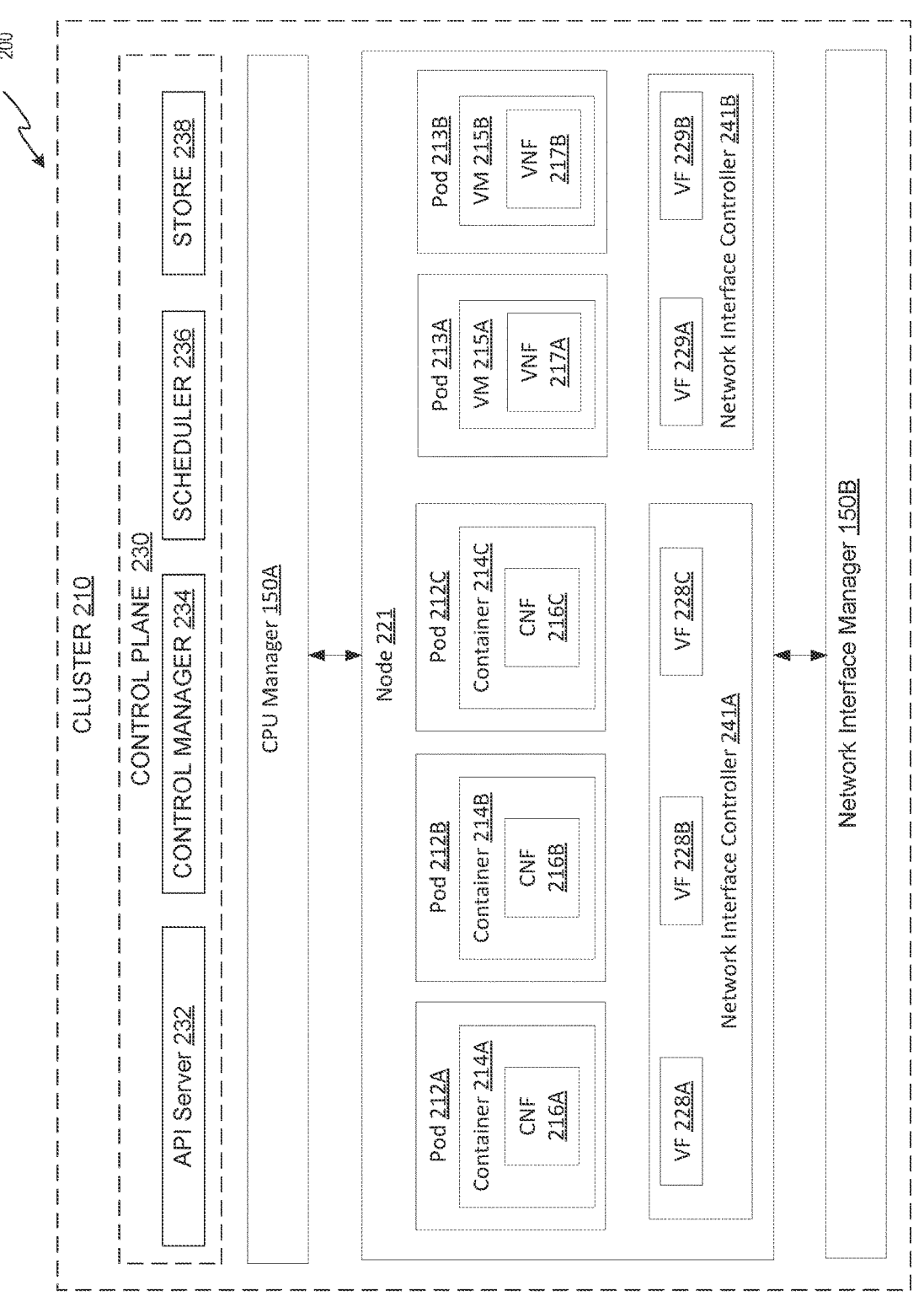
FIG. 2 depicts a component diagram of an example of a cluster, in accordance with one or more aspects of the present disclosure.

FIG. 2 illustrates an example system 200 that implements a power management component 150. The system 200 includes a cluster 210. The cluster 210 can be managed by a container orchestration system, such as Kubernetes. The container orchestration system can manage containerized workloads and services, and can facilitate declarative configuration and automation. A container orchestration system may include clusters, each of which includes a plurality of virtual machines or containers running on one or more host computer systems. Using clusters can allow a business entity with multiple services requirements to manage containerized workloads and services and facilitate declarative configuration and automation that is specific to one service among the multiple services.

Container orchestration systems can have built-in features to manage and scale stateless applications, such as web applications, mobile backends, and application programming interface (API) services, without requiring any additional knowledge about how these applications operate. For stateful applications, like databases and monitoring systems, which may require additional domain-specific knowledge, container orchestration systems can use operators, such as Kubernetes® Operator, to scale, upgrade, and reconfigure stateful applications. An operator refers to an application for packaging, deploying, and managing another application within a containerized computing services platform associated with a container orchestration system. A containerized computing services platform, such as Red Hat® Open-Shift®, refers to an enterprise-ready container platform with full-stack automated operations that can be used to manage, e.g., hybrid cloud and multicloud deployments. A containerized computing services platform uses operators to autonomously run the entire platform while exposing configuration natively through objects, allowing for quick installation and frequent, robust updates. More specifically, applications can be managed using an application programming interface (API), and operators can be viewed as custom controllers (e.g., application-specific controllers) that extend the functionality of the API to generate, configure, and manage applications and their components within the containerized computing services platform. The container orchestration systems can use objects to represent the state of the cluster, where the objects are persistent entities (e.g., an endpoint stored in a persistent storage) in the API database of the cluster, including pod, etc., as described below. The container orchestration systems can run the workload by placing containers or virtual machines into pods to run on nodes. Each node is managed by the control plane and contains the services necessary to run pods.

The cluster 210 includes a control plane 230 and a collection of nodes (e.g., nodes 111, 112, 121, 122). The control plane 230 is a collection of components that can make global control and management decisions about a cluster. The control plane 230 is responsible for maintaining the desired state (i.e., a state desired by a client when running the cluster) of the cluster 210, and such maintaining requires information regarding which applications are running, which container images applications use, which resources should be made available for applications, and other configuration details. The control plane 230 may include an API server 232, a control manager 234, a scheduler 236, and a store 238. The API server 232 can be used to define the desired state of the cluster 210. For example, the desired state can be defined by configuration files including manifests, which are JSON or YAML files that declare the type of application to run and the number of replicas required to run. The API server 232 can provide an API, for example, using JSON over HTTP, which provides both the internal and external interface. The API server 232 can process and validate requests and update the state of the API objects in a persistent store, thereby allowing clients to configure workloads and containers across worker nodes. The API server 232 can monitor the cluster 210, roll out critical configuration changes, or restore any divergences of the state of the cluster 210 back to what the deployer declared.

The control manager 234 can manage a set of controllers, and each controller implements a corresponding control loop that drives the actual cluster state toward the desired state, and communicates with the API server 232 to create, update, and delete the resources it manages (e.g., pods or service endpoints). For example, where the desired state requires two memory resources per application, if the actual state has one memory resource allocated to one application, another memory resource will be allocated to that application. The scheduler 236 can select a node for running an unscheduled pod (a basic entity that includes one or more containers/virtual machines and is managed by the scheduler), based on resource availability. The scheduler 236 can track resource use on each node to ensure that workload is not scheduled in excess of available resources. The store 238 is a persistent, distributed, key-value data store that stores the configuration data of the cluster, representing the overall state of the cluster at any given point of time.

The cluster 210 can include one or more nodes, e.g., node 221. The node 221 may include one or more pods, e.g., pods 212A, 212B, 212C, 213A, 213B. A "pod" refers to a basic entity that includes one or more containers/virtual machines and runs on a node. For example, a pod can include a group of one or more containers/virtual machines, with shared storage and network resources, and a specification for running the containers/virtual machines.

As shown in FIG. 2, pod 212A includes a container 214A, where container 214A provides a CNF 216A; pod 212B includes a container 214B, where container 214B provides a CNF 216B; pod 212C includes a container 214C, where container 214C provides a CNF 216C; pod 213A includes a virtual machine 215A, where virtual machine 215A provides a VNF 217A; pod 213B includes a virtual machine 215B, where virtual machine 215B provides a VNF 217B. VNFs 217A, 217B, CNFs 216A, 216B, 216C each represents a software application that can deliver one or more network functions such as directory services, routers, firewalls, load balancers, etc. While VNFs 217A, 217B each is implemented in a virtual machine, and CNFs 216A, 216B, 216C each is implemented in container.

The cluster 210 can include one or more network interface controllers (NICs), e.g., NIC 241A and NIC 241B. The NIC may provide, to the host computing system, access to a network, for the internal use by the host computing system or for the host computing system communicating externally to other systems or devices. In some implementations, NIC can be implemented with the single root input/output virtualization (SR-IOV) capabilities. SR-IOV is a specification that allows the isolation of PCI Express (PCIe) resources among various hardware functions for manageability and performance reasons, while also allowing that single physical PCIe device to be shared in a virtual environment. SR-IOV offers different virtual functions to different virtual components (e.g., a network adapter) on a physical server machine. SR-IOV also allows different virtual machines in a virtual environment to share a single PCIe hardware interface. SR-IOV defines two types of host-assignable interfaces or PCI functions: physical functions (PFs) and virtual functions (VFs). Because the physical function allows enumerating a number of virtual functions and a hypervisor or operating system can then assign those virtual functions to one or more container/virtual machines, SR-IOV requires two sets of drivers including a physical function driver to enumerate the virtual functions and the kernel needs to support a complete SR-IOV capable stack, and then the virtual functions require another driver that only can run the virtual functions.

In NICs having the single root input/output virtualization (SR-IOV) capabilities, a physical function can be used by the host computing system and usually represents a single NIC port, while each virtual function can be treated as a separate network interface, assigned to a container/virtual machine, and configured with its own medium access control (MAC) address, virtual local area network (VLAN) address, Internet Protocol (IP) addresses, etc. As shown in FIG. 2, NIC 241A includes VF 228A, VF 228B, VF 228C, where each can be assigned to a container/virtual machine; NIC 241B includes VF 229A, VF 229B, where each can be assigned to a container/virtual machine.

Figure 3A:
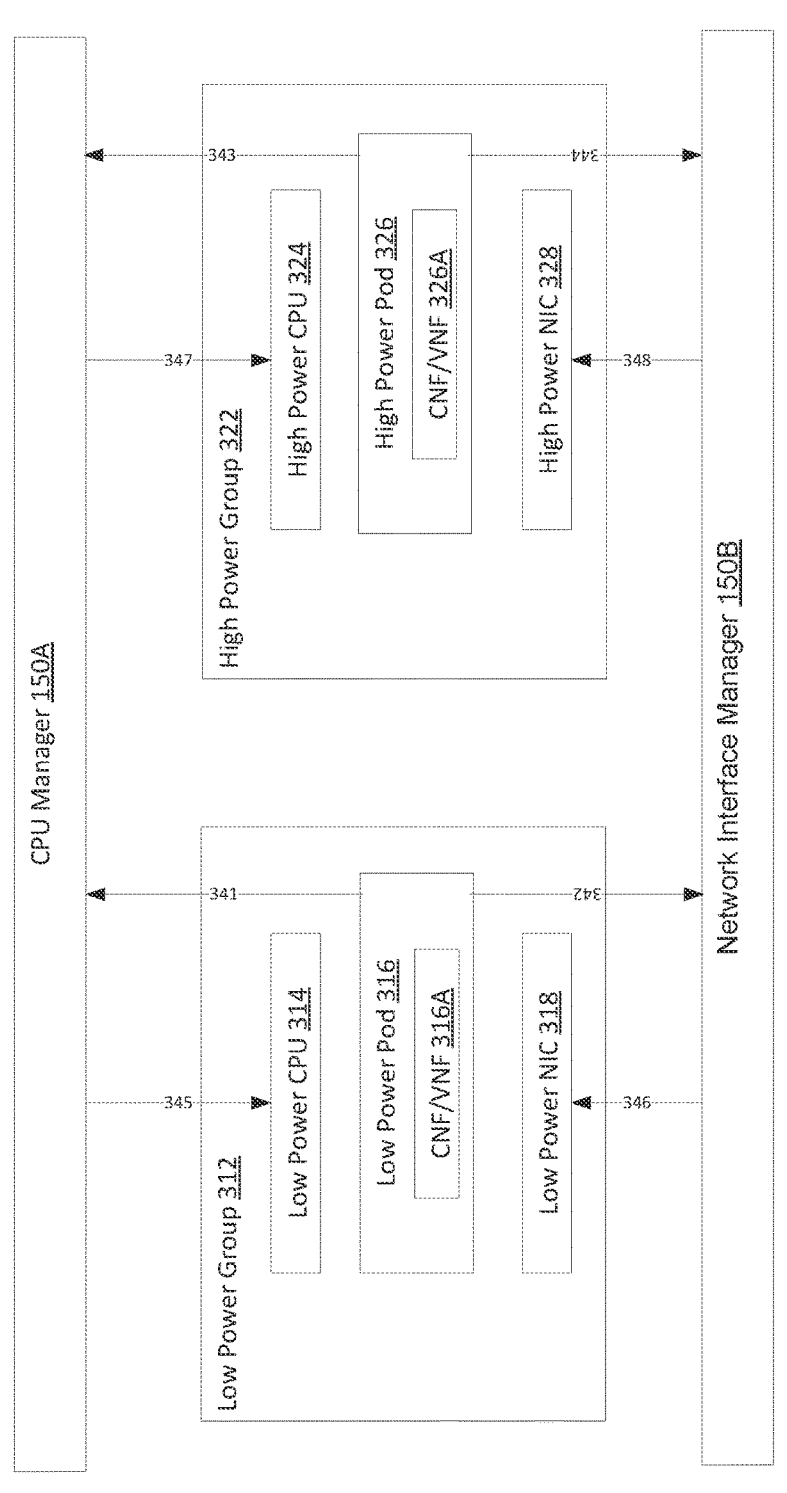
FIGS. 3A and 3B depict examples of systems implementing the power management for virtual network functions (VNFs)/containerized network functions (CNFs), in accordance with one or more aspects of the present disclosure.
Figure 3B:
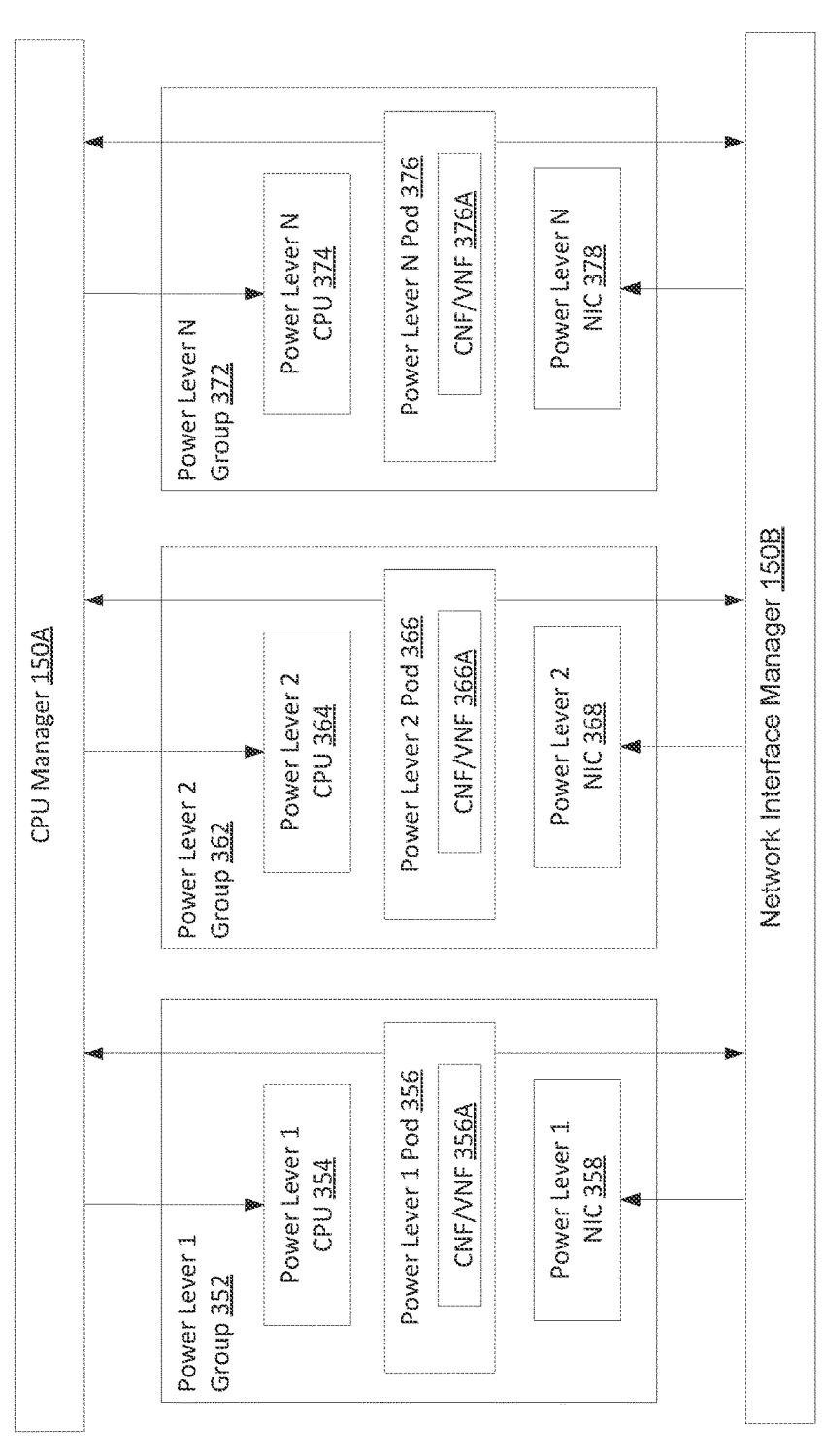

The cluster 210 can include a power management component 150 including a central processing unit (CPU) manager 150A and a network interface manager 150B. In some implementations, the network interface manager 150B can include a SR-IOV container network interface (CNI) plugin or a host-device CNI plugin. The CNI plugin enables the configuration and usage of network interfaces in containers and orchestrators. FIGS. 3A and 3B depict examples of using systems implementing the power management for VNFs/CNFs, in accordance with one or more aspects of the present disclosure. FIGS. 4A and 4B depict examples of providing power consumption intent, in accordance with one or more aspects of the present disclosure. The functionality of power management component 150 will be described along with the examples provided in FIGS. 3A-3B and 4A-4B.

The power management component 150 can create different power groups for CNF/VNF, for example, based on the CNF/VNF's power consumption intent. The CNF/VNF's power consumption intent refers to a predicted or intended level of power to be consumed by executing the CNF/VNF. The power group may represent a power level, for example, indicated by a range of a power metrics (e.g., X-Y watts). That is, the power management component 150 can designate at least two ranges for a level of power consumption, and each range represents a different power level. For example, as shown in FIG. 3A, the power management component 150 can designate two ranges for a level of power consumption: a low power group 312 and a high power group 322, where the low power group represents a power consumption level below a threshold value and the high power group represents a power metrics above or the same as a threshold value. As another example, as shown in FIG. 3B, the power management component 150 can designate multiple ranges for a level of power consumption: a power level 1 group 352, a power level 2 group 362, . . . , and a power level N group 372, where each power level group represents a power metrics within a range. Since FIGS. 3A and 3B provide similar systems except that FIG. 3A uses two power level groups and FIG. 3B uses multiple power level groups, the description below will mostly use two power level situation as shown in FIG. 3A for ease of description, but the multiple power level situation as shown in FIG. 3B is also applicable.

The power management component 150 may determine the CNF/VNF's power consumption intent. For example, the power management component 150 may define the intended level of power consumption for VNFs 217A, or 217B, or CNFs 216A, or 216B. In some implementations, the intended level of power consumption may be automatically provided by other components (e.g., based on configuration settings, monitoring, etc.). In some implementations, the intended level of power consumption may be provided through a pod definition. For example, as shown in FIG. 4A, the pod 400A named "example-high-power-pod" uses an annotation to declare the power consumption intent to be "high;" and as shown in FIG. 4B, the pod 400B named "example-low-power-pod" uses an annotation to declare the power consumption intent to be "low." In such cases, a CNF/VNF provided by a container/virtual machine in the "example-high-power-pod" pod can have a high power intent, which, for example, can correspond to a high power group 322; a CNF/VNF provided by a container/virtual machine in the "example-low-power-pod" pod can have a low power intent, which, for example, can correspond to a low power group 312. As another example, a first container/virtual machine can use an annotation to declare the intended level of power consumption to be "power level 1," a second container/virtual machine can use an annotation to declare the intended level of power consumption to be "power level 2," and a third container/virtual machine can use an annotation to declare the intended level of power consumption to be "power level N." In such cases, a CNF/VNF provided by the first container/virtual machine can have a power level 1 consumption intent, which, for example, can correspond to a power level 1 group 352; a CNF/VNF provided by the second container/virtual machine can have a power level 2 consumption intent, which, for example, can correspond to a power level 2 group 362; a CNF/VNF provided by the third container/virtual machine can have a power level N consumption intent, which, for example, can correspond to a power level N group 372.

The network interface manager 150B may check the CNF/VNF's power consumption intent, identify a network device corresponding to the power consumption intent, and assign the network device to the CNF/VNF. The network interface manager 150B may obtain the CNF/VNF's power consumption intent from the pod containing the CNF/VNF. The network interface manager 150B may identify a NIC running at a power that matches the power consumption intent. The network interface manager 150B may identify a NIC through a virtual function. For example, VF 229A may represent a port running at a low power of the NIC 241B, VF 229B may represent a port running at a high power of the NIC 241B, and the network interface manager 150B may identify the NIC 241B with VF 229A that matches the low power consumption intent, and identify the NIC 241B with VF 229B that matches the high power consumption intent. As another example, VF 228A may represent a port running at a first level power of the NIC 241A, VF 228B may represent a port running at a second level power of the NIC 241A, and the network interface manager 150B may identify the NIC 241A with VF 228A that matches the power level 1 consumption intent, and identify the NIC 241A with VF 228B that matches the power level 2 consumption intent. In some implementations, each virtual function represent a port running at a same power level of the NIC, and in such cases, the network interface manager 150B may identify the NIC with one VF that matches the low power consumption intent, and identify the NIC with two or more VFs that matches the high power consumption intent.

In some implementations, the network interface manager 150B assign the identified network device to the CNF/VNF by creating, modifying, and/or deleting management metadata. For example, the management metadata may include a data structure, the data structure can include multiple records, and each record maps a device identifier of the network device and/or a port identifier on the network device to an identifier (e.g., name) of CNF/VNF.

As shown in FIG. 3A, the CNF/VNF 316A has a low power consumption intent, and CNF/VNF 326A has a high power consumption intent. As indicated by step 342, the network interface manager 150B may obtain the CNF/VNF 316A's low power consumption intent from the low power pod 316. As indicated by step 346, the network interface manager 150B may identify a low power NIC 318 that matches the low power consumption intent. The network interface manager 150B may assign the low power NIC 318 to CNF/VNF 316A. As indicated by step 344, the network interface manager 150B may obtain the CNF/VNF 326A's high power consumption intent from the high power pod 326. As indicated by step 348, the network interface manager 150B may identify a high power NIC 328 that matches the high power consumption intent. The network interface manager 150B may assign the high power NIC 328 to CNF/VNF 326A.

The CPU manager 150A may check the CNF/VNF's power consumption intent, identify a processor (e.g., CPU) corresponding to the power consumption intent, and assign the processor to the CNF/VNF. The CPU manager 150A may obtain the CNF/VNF's power consumption intent from the pod containing the CNF/VNF. The CPU manager 150A may identify a processor running at a power that matches the power consumption intent. The CPU manager 150A may identify a processor through a frequency (e.g., low or high) or a core type (e.g., small or big, such as in a heterogeneous computing system). For example, a low power CPU 314 may represent a small CPU core running at a low power, a high power CPU 324 may represent a big CPU core running at a high power, and the CPU manager 150A may identify the CPU 314 that matches the low power consumption intent, and identify the CPU 324 that matches the high power consumption intent. As another example, a power level 1 CPU 354 may represent a CPU running at a first frequency range, a power level 2 CPU 364 may represent a CPU running at a second frequency range, and the CPU manager 150A may identify the CPU 354 that matches the power level 1 consumption intent, and identify the CPU 364 that matches the power level 2 consumption intent.

In some implementations, the CPU manager 150A assign the identified processor to the CNF/VNF by creating, modifying, and/or deleting management metadata. For example, the management metadata may include a data structure, the data structure can include multiple records, and each record maps an identifier of the processor to an identifier (e.g., name) of CNF/VNF.

As shown in FIG. 3A, the CNF/VNF 316A has a low power consumption intent, and CNF/VNF 326A has a high power consumption intent. As indicated by step 341, the CPU manager 150A may obtain the CNF/VNF 316A's low power consumption intent from the low power pod 316. As indicated by step 345, the CPU manager 150A may identify a low power CPU 314 that matches the low power consumption intent. The CPU manager 150A may assign the low power CPU 314 to CNF/VNF 316A. As indicated by step 343, the CPU manager 150A may obtain the CNF/VNF 326A's high power consumption intent from the high power pod 326. As indicated by step 347, the CPU manager 150A may identify a high power CPU 324 that matches the high power consumption intent. The CPU manager 150A may assign the high power CPU 324 to CNF/VNF 326A.

Once the NIC and CPU are allocated for the CNF/VNF, the network interface manager 150B can designate the allocated CPU to handle the interrupts generated by the CNF/VNF via the allocated NIC to be align with CNF/VNF's power consumption intent. For example, as shown in FIG. 3A, when the CNF/VNF 316A generates an interrupt, the network interface manager detects the interrupt through the low power NIC 318 and designates the low power CPU 314 to handle the interrupt; when the CNF/VNF 326A generates an interrupt, the network interface manager detects the interrupt through the high power NIC 328 and designates the high power CPU 324 to handle the interrupt.

FIG. 5 depicts a flow diagram of an illustrative example of a method 500 for implementing power management for VNFs/CNFs, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 500 may be performed by processing devices of a server device or a client device. At operation 510, the processing logic determines, for example, through an annotation, an intended level of energy consumption associated with a network function. In some implementations, the network function can be implemented in a virtualized computing environment in a containerized computing cluster, and the containerized computing cluster can include a plurality of virtualized computing environments running on one or more host computer systems. In some implementations, the network function can include at least one of a virtualized network function or a containerized network function. The annotation refers to metadata attached to the virtualized network function or the containerized network function. In some implementations, the annotation is defined through a definition of the virtualized computing environment (e.g., a pod definition) using a container orchestration system. In some implementations, the intended level of energy consumption is within one of at least two ranges, each range representing a respective power level. In some implementations, the processing logic designates at least two ranges for a level of power consumption, wherein each range of the at least two ranges represents a different power level.

At operation 520, the processing logic allocates, in view of the intended level of energy consumption, a network device to the network function. In some implementations, the processing logic allocates the network device by matching a power level that the network device runs on with the intended level of energy consumption. In some implementations, the processing logic allocates the network device via a virtual function. In some implementations, the processing logic identifies the network device running at a power level corresponding to the intended level of power consumption. In some implementations, the network device comprises a network interface controller (NIC).

At operation 530, the processing logic allocates, in view of the intended level of energy consumption, a processor to the network function. In some implementations, the processing logic allocates the processor by matching a power level that the processor runs on with the intended level of energy consumption. In some implementations, the processing logic identifies the processor running with a frequency corresponding to the intended level of power consumption. In some implementations, the processor running with a core type corresponding to the intended level of power consumption. In some implementations, the processor comprises a central processing unit (CPU).

At operation 540, the processing logic designates the processor to handle an interrupt from the network function via the network device.

Figure 6:
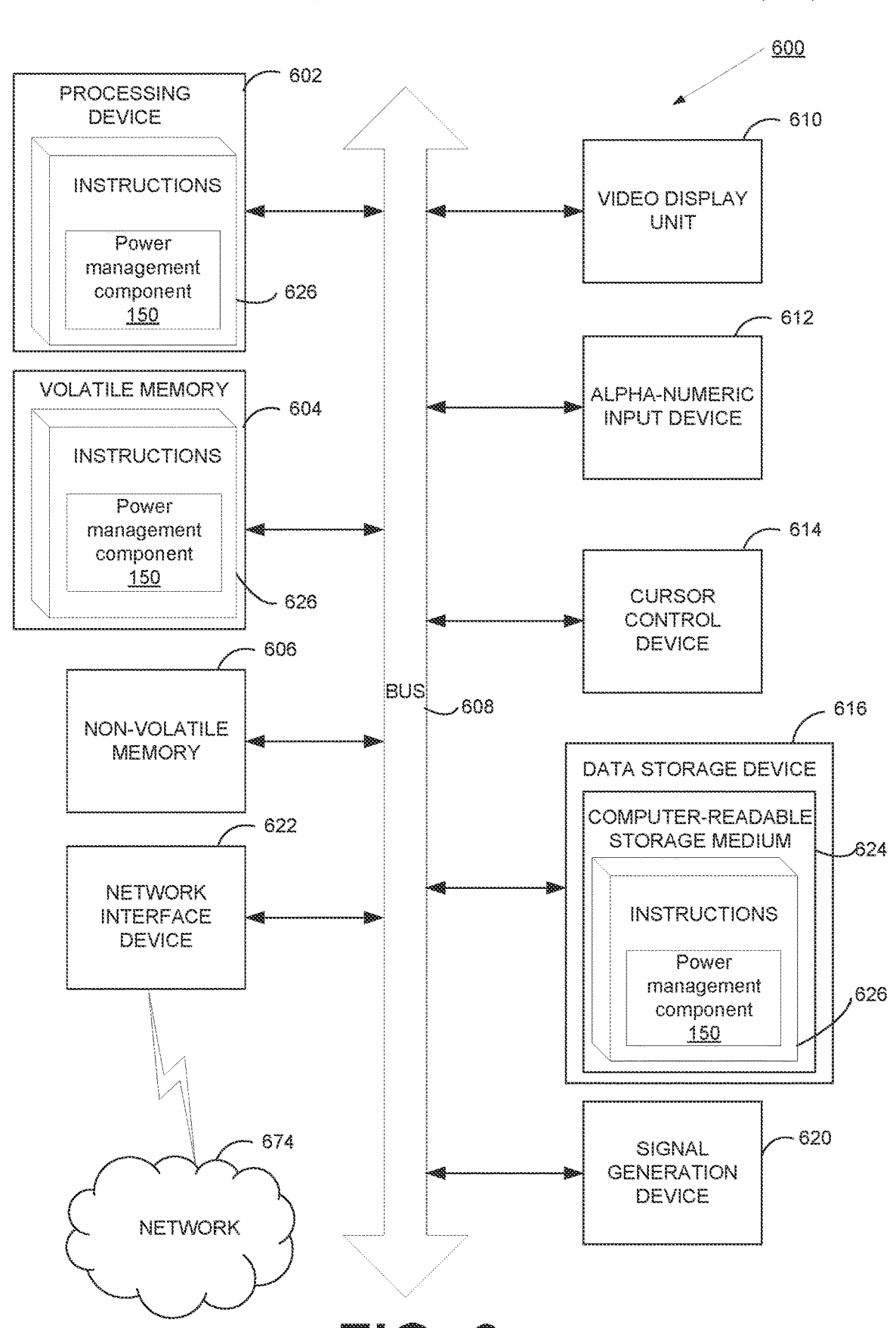
FIG. 6 depicts a block diagram of an example computer system operating in accordance with one or more aspects of the present disclosure.

FIG. 6 depicts an example computer system 600, which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application-specific integrated circuit (ASIC), a field-programmable gate array (FPGA), a digital signal processor (DSP), network processor, or the like. The processing device 602 is configured to execute processing logic (e.g., instructions 626) that includes the power management component 150 for performing the operations and steps discussed herein (e.g., corresponding to the method of FIG. 5).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a non-transitory computer-readable medium 624 on which may store instructions 626 that include power management component 150 (e.g., corresponding to the methods of FIG. 5) embodying any one or more of the methodologies or functions described herein. Power management component 150 may also reside, completely or at least partially, within the main memory 604 and/or within the processing device 602 during execution thereof by the computer system 600, the main memory 604, and the processing device 602 also constituting computer-readable media. Power management component 150 may further be transmitted or received via the network interface device 622.

While the computer-readable storage medium 624 is shown in the illustrative examples to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operations may be performed, at least in part, concurrently with other operations. In certain implementations, instructions or sub-operations of distinct operations may be in an intermittent and/or alternating manner.

It is to be understood that the above description is intended to be illustrative and not restrictive. Many other implementations will be apparent to those of skill in the art upon reading and understanding the above description. Therefore, the scope of the disclosure should be determined with reference to the appended claims, along with the full scope of equivalents to which such claims are entitled.

In the above description, numerous details are set forth. However, it will be apparent to one skilled in the art that aspects of the present disclosure may be practiced without these specific details. In some instances, well-known structures and devices are shown in block diagram form rather than in detail in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for specific purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD- ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general-purpose systems may be used with programs in accordance with the teachings herein, or it may prove convenient to construct a more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, the use of the words "example" or "exemplary" is intended to present concepts in a concrete fashion. As used in this application, the term "or" is intended to mean an inclusive "or" rather than an exclusive "or." That is, unless specified otherwise or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, the use of the term "an embodiment" or "one embodiment" or "an implementation" or "one implementation" throughout is not intended to mean the same embodiment or implementation unless described as such. Furthermore, the terms "first," "second," "third," "fourth," etc., as used herein, are meant as labels to distinguish among different elements and may not have an ordinal meaning according to their numerical designation.

What is claimed is:

1. A method comprising:
   determining, by a processing device, an intended level of power consumption associated with a network function comprising a virtualized network function or a containerized network function, the network function implemented in a virtualized computing environment in a containerized computing cluster, wherein the containerized computing cluster comprises a plurality of virtualized computing environments running on one or more host computer systems;

allocating, in view of the intended level of power consumption, a network device to the network function;
   allocating, in view of the intended level of power consumption, a processor to the network function; and
   designating the processor to handle interrupts from the network function via the network device.

2. The method of claim 1, wherein the intended level of power consumption is within one of at least two ranges, each range representing a respective power level.

3. The method of claim 1, wherein allocating the network device to the network function further comprises:
   allocating the network device via a virtual function that represents a separate network interface.

4. The method of claim 1, wherein allocating the network device to the network function further comprises:
   identifying the network device running at a power level corresponding to the intended level of power consumption.

5. The method of claim 1, wherein allocating the processor to the network function further comprises:
   identifying the processor running with a frequency corresponding to the intended level of power consumption.

6. The method of claim 1, wherein allocating the processor to the network function further comprises:
   identifying the processor running with a core type corresponding to the intended level of power consumption.

7. The method of claim 1, wherein the network device comprises a network interface controller (NIC).

8. A system comprising:
   a memory;
   a processing device coupled to the memory, the processing device to perform operations comprising:
      defining an intended level of power consumption associated with a network function comprising a virtualized network function or a containerized network function, wherein the network function is implemented in a virtualized computing environment in a containerized computing cluster, and wherein the containerized computing cluster comprises a plurality of virtualized computing environments running on one or more host computer systems;
      allocating, in view of the intended level of power consumption, a network device to the network function;
      allocating, in view of the intended level of power consumption, a processor to the network function; and
      designating the processor to handle interrupts from the network function via the network device.

9. The system of claim 8, the intended level of energy consumption is within one of at least two ranges, each range representing a respective power level.

10. The system of claim 8, wherein allocating the network device to the network function further comprises:
    allocating the network device via a virtual function that represents a separate network interface.

11. The system of claim 8, wherein allocating the network device to the network function further comprises:
    identifying the network device running at a power level corresponding to the intended level of power consumption.

12. The system of claim 8, wherein allocating the processor to the network function further comprises:
    identifying the processor running with a frequency corresponding to the intended level of power consumption.

13. The system of claim 8, wherein allocating the processor to the network function further comprises:

identifying the processor running with a core type corresponding to the intended level of power consumption.

14. A non-transitory computer-readable storage medium comprising instructions that, when executed by a processing device, cause the processing device to perform operations comprising:

defining an intended level of power consumption associated with a network function comprising a virtualized network function or a containerized network function, wherein the network function is implemented in a virtualized computing environment in a containerized computing cluster, and wherein the containerized computing cluster comprises a plurality of virtualized computing environments running on one or more host computer systems;

allocating, in view of the intended level of power consumption, a network device to the network function;

allocating, in view of the intended level of power consumption, a processor to the network function; and designating the processor to handle interrupts from the network function via the network device.

\* \* \* \* \*